United States Patent [19]

Waters

[11] 4,194,386
[45] Mar. 25, 1980

[54] VARIABLE AREA METERING TUBE AND METHOD OF MANUFACTURE

[75] Inventor: E. Craig Waters, Lansdale, Pa.
[73] Assignee: G. D. Searle & Co., Skokie, Ill.
[21] Appl. No.: 896,656
[22] Filed: Apr. 17, 1978
[51] Int. Cl.² ............................................. G01F 25/00
[52] U.S. Cl. ........................................ 73/3; 29/407
[58] Field of Search ............... 73/207, 209, 3; 29/407

[56] References Cited

U.S. PATENT DOCUMENTS

| | | | |
|---|---|---|---|
| 1,301,714 | 4/1919 | Kueppers | 73/209 |
| 1,899,764 | 2/1933 | Machlet | 73/209 |
| 1,980,761 | 11/1934 | Mock et al. | 73/209 |
| 2,087,279 | 7/1937 | Deming | 73/209 |
| 3,177,699 | 4/1965 | Lindquist et al. | 73/3 |

OTHER PUBLICATIONS

Publication, "Comparison of Some Methods of Calibrating . . . Water". J. Pichon Disa, Oct. 1970, pp. 15–21.

*Primary Examiner*—Daniel M. Yasich
*Attorney, Agent, or Firm*—John A. Dhuey; James R. Henes

[57] ABSTRACT

A variable area metering tube is described having a non-linear graduated measuring scale wherein the scale compensates for non-standard variations in the cross-sectional flow area of the metering tube.

1 Claim, 3 Drawing Figures

VARIABLE AREA METERING TUBE AND METHOD OF MANUFACTURE

This invention is concerned with variable area metering tubes used in fluid operations. More particularly, it is concerned with metering tubes having a non-linear measuring scale which compensates for non-standard variations in the cross-sectional flow area of the tube. The non-linear scale permits the tube to be used with standard flow calibration curves presently used in flow metering applications.

The invention is illustrated in part by the drawings in which.

Figure 1:
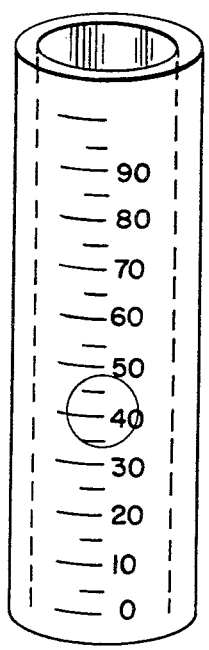
FIG. 1 is an elevational view of a prior art tube.
Figure 2:
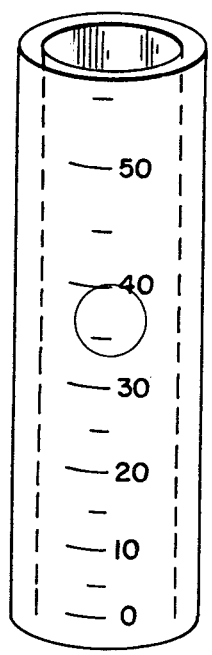
FIG. 2 is an elevational view of a tube of this invention.

In the past, variable area metering tubes have been manufactured with linear scales, graduated in units of length, most commonly millimeters, along the length of the tube. The scale reading on the tube is translated into flow rate for a particular gas and float combination utilizing calibration curves, such as that shown in FIG. 3, which are standard throughout the industry.

In order to understand and fully appreciate the present invention, it is necessary to understand the practices of both users and manufactures in the flow measurement area. Variable area metering tubes conventionally are manufactured by vacuum drawing a glass tube at elevated temperatures, e.g. 1450° F., down upon a metal, commonly stainless steel, mandrel. The mandrel is machined with a variable cross-sectional area and with flutes along the sides thereof. The inner surface of the glass tube conforms itself to the shape of the mandrel. The differences in coefficients of expansion of the glass tube and the metal mandrel permit the mandrel to be removed from the tube when the tube and mandrel have been cooled at the end of the vacuum drawing operation.

Proper machining of the mandrel is critical since prior practice dictated that a linear scale was to be placed on the tube to produce an operational unit which could be utilized with standard flow calibration charts employed by users of the variable area tubes. Minor variations in the mandrel dimensions are practically impossible to prevent given standard machining tolerances. A vast majority of mandrels produced, even under the most exacting control procedures, are unsuitable for use in producing linear graduated tubes and must be discarded. Even when a proper mandrel is fabricated, its useful life is limited since it tends to wear on its surface during tube production. Accordingly, after a limited number of manufacturing cycles, it too must be discarded. Tube production thus becomes a very expensive operation due to the large number of mandrels which must be fabricated.

Users of variable area metering tubes demand a tube which can be used with standard calibration curves. While it would theoretically be possible to supply a new calibration curve with each tube supplied to a user, that solution is unsatisfactory since the user does not wish to constantly change calibration curves present in operating manuals. Users demand a metering tube wherein the scale readings are directly translatable into actual flow rate using standard calibration curves.

It has been discovered that variable area metering tubes produced from non-standard mandrels can be utilized by inscribing a non-linear scale on the tubes, which compensates for the non-standard variations in the cross-sectional flow area of tube. The use of a non-linear, compensating scale permits the metering tubes to be utilized with standard calibration curves presently employed by users of flow tubes. Scale readings are directly translatable into actual flow rate using the standard calibration curves.

The tubes of this invention are manufactured according to the following sequence of operations. First a mandrel is machined to meet specifications set to provide a certain cross-sectional flow area in a tube of desired shape and dimensions. To the extent practically possible, the mandrel is machined to conform to one which would produce a standard, linear tube. A glass tube of appropriate internal diameter is then placed over the mandrel and one end is closed, typically by heat. The other end of the tube is connected to a vacuum source and the tube mandrel combination is heated to an elevated temperature, typically to about 1450 degrees Farenheit, while the vacuum is being maintained. The tube thus is drawn down upon the mandrel and the tube's internal surface conforms to the shape of the mandrel. Then the vacuum source is removed, the tube and mandrel cooled and the mandrel removed from the tube. The latter operation is possible due to the differences in the thermal expansion characteristics of the glass and metal.

The closed end of the raw tube then is cut from the remaineer of the tube and the tube is cut to a standard length to fit within standard support units. An appropriate float is placed within the tube and retained therein by conventional means, typically a star-shaped plastic insert inserted into the bottom of the tube.

Since the mandrel from which the tube was produced has created a non-standard cross-sectional flow area, a linear scale cannot simply be applied to the tube to create a metering tube useful with a standard calibration curve. Rather the tube is operatively connected to a conventional apparatus for measuring actual flow rate and to a source of fluid. Fluid flow through the tube is commenced and at specific actual flow rates the position of the float in the tube is marked. Adjacent the mark at that float position is placed the tube scale reading obtained from a standard calibration curve for the particular gas and float combination being used. The process is then repeated at other specified flow rates to produce a non-linear scale on the tube which directly translates into actual flow rate when used with a standard calibration curve.

Figure 3:
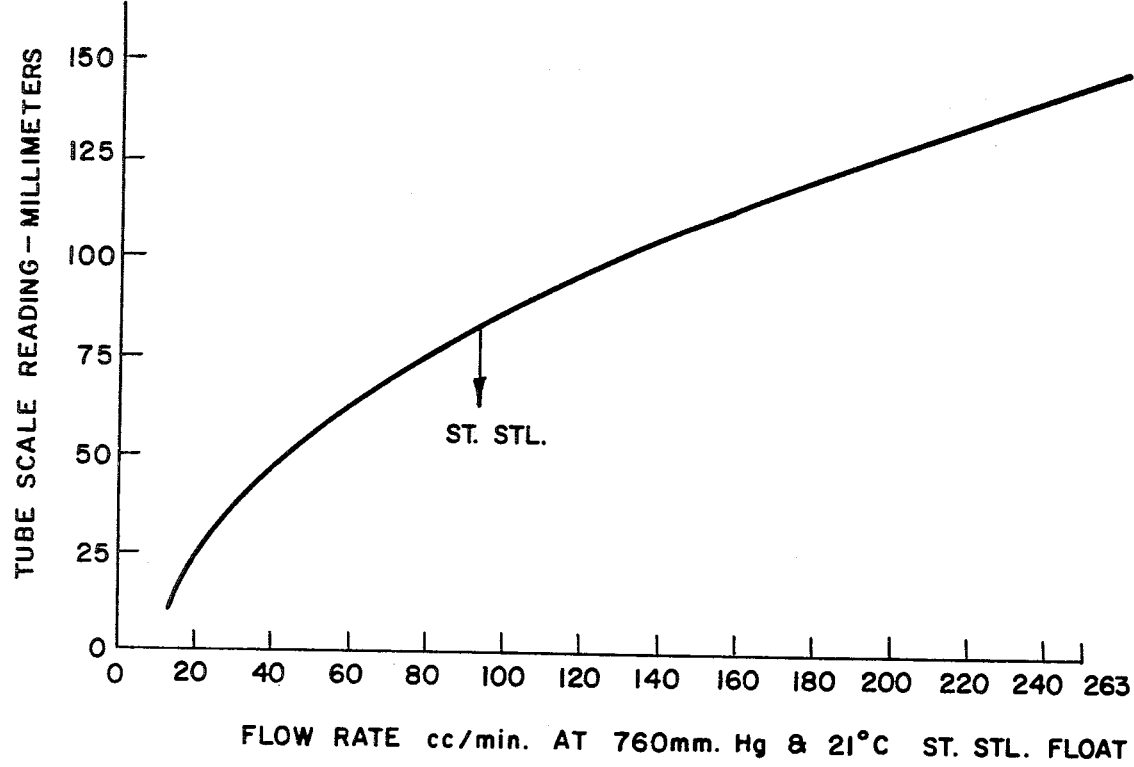
FIG. 3 is a typical standard calibration curve.

A more detailed description of the manufacturing method for illustration purposes follows, utilizing the standard calibration curve shown in FIG. 3. It is assumed that a non-standard tube, i.e. a tube on which the imposition of a linear scale would not give flow rates for a particular gas and float combination corresponding to a standard calibration curve, has been produced, that the tube has been cut to length, that a stainless steel float has been inserted into the tube, and that the fluid is air. The tube normally is intended to measure air flow rates over a predetermined range, and is connected to a source of air and to an indicator which provides a reading of actual flow rate.

Typically, the air flow rate is increased to 12 cc./min., corresponding to a 10 mm. reading on the standard calibration curve. The position of the float in the tube at that flow rate is marked and the notation 10 mm. is placed next to that index. Next the flow rate is increased to 18 cc./min. and the position of the float is marked. The standard calibration curve indicates a reading of 20 mm. at 18 cc./mm. and 20 mm. is placed next to that float mark. Flow rate then is increased to 24 cc./min., the float position again is marked, and the 30 mm. reading from the standard curve is placed next to that float mark. The process then is continued until the whole of the desired flow range has been covered. It is apparent that finer gradations in the tube seal can be made by decreasing the increments in flow rate during the scale inscription procedure.

Due to the non-standard character of the tubes, the notation 10 mm. does not actually indicate a position 10 mm. distant from the 0 mark nor 20 mm. from the 0 mark. The scale is non-linear, due to the non-conformance to the standard tube and yet permits the non-standard tube to be utilized with standard calibration curves.

It is apparent that the above-defined process can be employed with differently sized tubes, different float materials and different gases. In each case, a tube is produced which, although it is nonstandard, can be used with a standard calibration curve.

What is claimed is:

1. In a process for manufacturing a first variable area metering tube on a first mandrel machined to conform to a second mandrel, said second mandrel being substantially free of dimensional and surface irregularities and being useful to produce a second metering tube which is substantially free of variations in its cross-sectional flow area and for which a calibration curve is prepared which in combination with a linear graduated scale applied to said second tube indicates the fluid flow rate through said second tube, said first mandrel having dimensional or surface irregularities such that said first tube made thereon has variations in its cross-sectional flow area which preclude application thereto of a linear graduated scale to indicate in combination with said calibration curve for said second tube the fluid flow rate through said first tube, the improvement of applying a non-linear graduated scale to said first tube, wherein said non-linear scale compensates for said variations in the cross-sectional flow area of said first tube and readings from said non-linear scale are capable of translation into fluid flow rates through said first tube from said calibration curve for said second tube, which comprises:

(a) creating a known fluid flow rate through said first tube;

(b) marking the float position on said first tube at said known flow rate;

(c) determining the scale reading corresponding to said known flow rate from said calibration curve for said second tube;

(d) marking said first tube with said scale reading opposite the float position at said known flow rate; and (e) repeating steps (a)-(d) sequentially over a predetermined range of flow rates through said first tube to thereby apply said non-linear scale to said first tube.

* * * * *